United States Patent

Townsend

[11] Patent Number: 6,076,740
[45] Date of Patent: Jun. 20, 2000

[54] IRRIGATION CONTROL SYSTEM

[75] Inventor: James Dunstone Townsend, Skye, Australia

[73] Assignee: Irrigation Control Networks Pty. Ltd., Adelaide, Australia

[21] Appl. No.: 09/117,477
[22] PCT Filed: Feb. 3, 1997
[86] PCT No.: PCT/AU97/00056
  § 371 Date: Jul. 30, 1998
  § 102(e) Date: Jul. 30, 1998
[87] PCT Pub. No.: WO97/27733
  PCT Pub. Date: Aug. 7, 1997

[30] Foreign Application Priority Data

Feb. 2, 1996 [AU] Australia ............... PN 7845

[51] Int. Cl.$^7$ ............ B05B 17/00; A01G 25/00; A01G 27/00
[52] U.S. Cl. ............ 239/1; 239/64; 239/69
[58] Field of Search ............ 239/64, 65, 69, 239/1; 137/78.2, 78.3

[56] References Cited

U.S. PATENT DOCUMENTS

| | | | |
|---|---|---|---|
| 4,396,149 | 8/1983 | Hirsch | 239/63 |
| 4,613,764 | 9/1986 | Lobato | 137/78.3 |
| 5,097,861 | 3/1992 | Hopkins et al. | 239/63 |
| 5,361,534 | 11/1994 | Burns et al. | 47/79 |
| 5,375,617 | 12/1994 | Young | 137/78.3 |

Primary Examiner—Andres Kashnikow
Assistant Examiner—Davis Hwu
Attorney, Agent, or Firm—Seidel, Gonda, Lavorgna & Monaco, PC

[57] ABSTRACT

An irrigation control system for land includes a weather station to measure one or more weather conditions in a first area; means to measure rainfall in a sub-area of the first area; and a computer connected directly or indirectly to the weather station and rainfall-measuring means. The computer is adapted to monitor the measurements of the weather station and rainfall-measuring means, to calculate a moisture content value for the sub-area from the measurements and a predetermined moisture loss for the sub-area, and to regulate irrigation of the sub-area.

21 Claims, 1 Drawing Sheet

IRRIGATION CONTROL SYSTEM

FIELD OF THE INVENTION

The invention relates to an irrigation control system for a predetermined area. In particular, the area may be turf and/or garden locations over a very wide area, for example, an entire metropolitan area of a large city.

BACKGROUND OF THE INVENTION

Controllers to start and stop irrigation cycles without human intervention are well known. These controllers send an electric current (usually 24 volt alternating current in horticultural or agricultural use) to a remote solenoid valve, causing the valve to open. Valve closure is usually effected by discontinuing the supply of electric current to the solenoid of the valve whereupon the valve is caused to close.

Most of these types of controllers are able to handle a number of valves, opening and closing them in a programmed succession for programmed times on programmed days of the week. This series of sequential valve opening and closing on specified days is generally referred to as "a program" or "an irrigation program". Many of the known controllers are capable of storing and executing more than one irrigation program, which adds a degree of flexibility to what the controller may accomplish.

Basically these prior controllers fall into one of three categories as follows:

1. Relatively inexpensive controllers which are capable of executing an irrigation program. These controllers are not capable of changing the set irrigation program in any way to take account of differing water needs of plants occasioned by variations in meteorological conditions.

Controllers of this type constitute well over 90 per cent of all irrigation controllers currently in use in Australia. Such controllers will, if the irrigation program is not regularly modified inevitably waste considerable quantities of water, since it will be programmed to supply sufficient water to serve the needs of the plant being irrigated during periods when plant demand for water is high.

Thus when the same application of irrigation water continue during periods of low plant water requirement, wastage occurs.

Additionally, such controllers are incapable of responding to occurrence of rain periods unless coupled to some specialist sensor designed for the purpose. Whilst such sensors are known they tend to be either expensive (and consequently little used) or unreliable (and again little used). The potential to save water by in effect harvesting rainfall by discontinuing irrigations until that rainfall finds its way into the root-zone and is transpired by the plants, is lost unless the controller can be manually de-activated. When managing large numbers of such controllers, particularly over a wide area, it is generally not possible to manually de-activate them and re-activate them when irrigation should commence.

2. More expensive controllers which can alter the frequency and amount of irrigation, either up or down, as time passes in an effort to match applications to plant requirements. Such devices usually impute likely plant requirements by use of meteorological averages developed from examination of many years of meteorological records relating to the geographical area under consideration. This type of controller is an improvement upon the first described type of controller, but is still arbitrary and inflexible as it relies on averages which must inevitably waste water when the predicted conditions do not occur. Additionally, there can be no improvement in harvesting rainfall.

3. Expensive controllers which either accept direct input from an automatic weather stations, or accept meteorological information directly or indirectly from a remote weather station or climatic recording facility. These controllers use such information to modify a basic program so that irrigation water applications are substantially in accord with actual plant requirements. These controllers may also be activated to apply a predetermined irrigation cycle when instructed to do so by a remote software program which accepts meteorological input and maintains a water budget for the area. However, such controllers do not utilise localised rainfall measurement and consequently irrigation management depends upon rainfall information indicative of a wider area than the irrigation area. Water wastage can result. Further, these controllers must be part of a very wide network which means that over a wide area very considerable telephony or radio costs are necessarily involved.

OBJECT OF THE INVENTION

It is an objective of the present invention to provide an irrigation control system which ameliorates the disadvantages referred to above.

SUMMARY OF THE INVENTION

According to one form of the invention an irrigation control system for land is provided which includes:

(a) at least one first means to measure one or more weather conditions in a first area;

(b) at least one second means to measure rainfall in a sub-area of the first area; and (c) control means connected directly or indirectly to the first and second means, the control means adapted to monitor the measurements of the first and second means, to calculate a moisture content value for the sub-area from the measurements and a predetermined moisture loss for the sub-area, and to regulate the irrigation in a sub-area.

Preferably, regulation of irrigation in the sub-area is either by initiating or preventing irrigation of the sub-area depending upon whether the moisture content value is less than or more than a predetermined moisture content value for the sub-area.

Typically, there will be one first means in each sub-area.

Typically, there will be one second means in each sub-area.

Preferably the weather conditions measured include solar radiation.

Preferably, the second means includes a sensing means, a measuring means and a data logger.

Preferably, the control means is a computer.

According to a preferred form of the invention, the irrigation control system further includes a local switch means in the sub-area to initiate or prevent irrigation in response to signals from the control means.

According to another preferred form of the invention, the local switch means in the sub-area energises or de-energises a local control means for initiating or preventing the irrigation, in response to signals from the control means.

According to another preferred form of the invention, the irrigation control system further includes interruption means to interrupt irrigation in the sub-area Preferably, this interrupts irrigation in the sub-area in response to rainfall in the sub-area Typically, the interruption occurs for a period of time determined by the control means.

In another independent aspect of the invention, a method of irrigating land is provided which includes the steps of:

(a) measuring one or more weather conditions in a first area;

(b) measuring rainfall in a sub-area of the first area;

(c) monitoring the measurements;

(d) calculating a moisture content value for the sub-area from the measurements and a predetermined moisture loss for the sub-area; and (e) regulating the irrigation of the sub-area.

Preferably the regulation of the irrigation of the sub-area is either by initiating or preventing irrigation of the sub-area depending upon whether the moisture content value is less than or more than a predetermined moisture content value for the sub-area.

Preferably, the measurement in step (a) is carried out in the same sub-area as that in which the measurement is carried out in step (b).

Preferably the method includes a further step of (f) sensing for rainfall in the sub-area during irrigation and interrupting irrigation in response to rainfall in the sub-area for a period of time controlled by the duration and amount of rainfall.

Using the system and method described above, it is possible to more accurately manage the irrigation of an area and minimise over irrigation and hence wastage of water.

DESCRIPTION OF THE DRAWINGS

The invention will now be further explained and illustrated by reference to the accompanying drawings in which.

Figure 1:
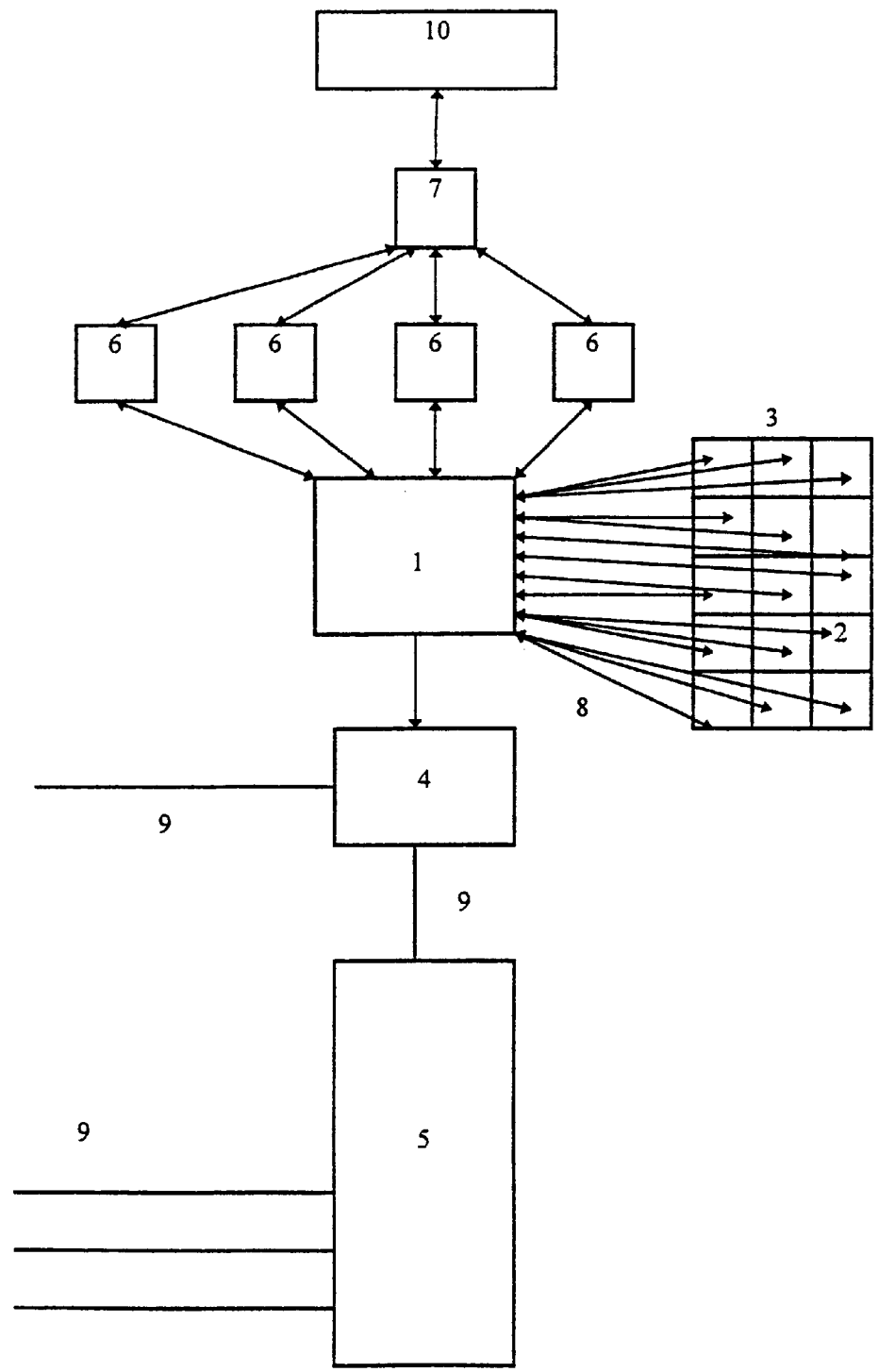
FIG. 1 is a schematic diagram of one form of the invention.

In overview, the system depicted includes a main computer 1 which is connected to fifteen weather stations 2. Each sub-area 3 has at least one weather station 2. Each weather station 2 carries out a dual purpose in this particular illustration of the system of the invention. Firstly, it can measure weather conditions such as solar rays and temperature. Secondly it can measure and record rainfall in the sub-area.

Main computer 1 monitors the weather station and can calculate the moisture content value for a particular sub-area 3.

Main computer 1 also communicates to one or more switches 4 typically by a paging network. Each of these switches is associated with a pre-existing irrigation controller 5 for a particular tract of land. Each switch 4 is controlled by the main computer 1 and by closing or opening switch 4 may permit or prevent the controller 5 from irrigating the tract of land according to its own programmed cycle.

Where users require external access to the system, to review and/or alter the irrigation control system settings for a particular site, a dial up facility is provided. External users 10 will access a network of computers 6 via a call sequencer 7. The user 10 enters by security identification and identification of the particular site. The user 10 is then given access to the weather information and the settings for that particular site which have been down loaded to the network computer 6 from the main computer 1. The user 10 may change the settings and this information is then transmitted to the main computer.

A typical implementation procedure for the irrigation control system as depicted is as follows.

The area in which the irrigation is to be controlled is defined. In most cases this will be the greater metropolitan area and environs of a large city, or the general area and environs of a provincial city, or the area covered by a town.

Once the overall area is defined, it is further divided into sub-areas 3. A sub-area 3 is defined by a common or similar microclimate. This division is necessarily subjective and will usually contain inaccuracies, however, this does not markedly affect the operation of the system and does not interfere with the system achieving efficient irrigation management outcomes.

Typically, a large metropolitan area and environs of a city, eg one million people, may contain 10–15 sub-areas 3. These sub-areas 3 will be identified by a number.

To define sub-areas 3, a number of empirical factors are used including:

General orientation (North, South etc.)

Landform (plain, valley area, slope)

Overall land use

Density of buildings, etc.

Once the overall area has been defined and then further sub-divided into (10–15) sub-areas 3, the following external support network is put in place. At least one rain-gauge and its supporting data accumulating logger is positioned in a convenient location in each sub-section and connected by communication means 8 (usually telephone or radio or a combination of both) to the main computer 1. As indicated above, at least one weather station 2 may be installed within the sub-area 3. In one alternative (not shown) at least one weather station 2 may be installed in the overall area and not specifically in the sub-area 3. In another alternative (not shown) there may be a combination of those alternatives.

Once the external support network is in place and connected to the main computer 1 the surveying of the individual irrigation sites within each sub-area can begin. Each site is surveyed with a view to accurately establishing the following:

Area (sq.m) to be irrigated.

Root Zone Depth (RZD). This is a sensible site range.

Precipitation Rate of the irrigation system.

Soil texture within the root zone.

With the data from the above, calculations can now be done to establish the following:

Total Available Water (TAW (mm)=RZD(cm)×SMHC) where SMHC (Soil moisture holding capacity is typically 0.75 mm/cm for sand; 1.00 mm/cm for sandy loam; 1.40 mm/cm for loam; 1.60 mm/cm for clay loam and 1.80 mm/cm for clay).

Refill Point (RFP(mm)=TAW(mm)×f) Where f is a factor, 0.4 has been found satisfactory for most soils Optimum Irrigation Event (OIE(mins)=((TAW(mm)−RFP(mm))/PR(mm/hr)×60) Where PR is Precipitation rate (mm/hr).

Each individual site is now registered on the main computer 1 with its basic factors indicated above (TAW, RFP, OIE, PR) and its identification number which tells the system within which sub-area 3 it lies.

The switch 4 is now connected to the controller 5 at each site. Switch 4 is connected across the common wire (or wires) 9 of controller 5. Typically the switch 4 will take power (24vAC) from the controller 5.

Now a program is entered into the controller 5 which calls for the calculated Optimum Irrigation Event to be applied to each site the first night.

In this arrangement, the controller 5 is allowed to operate on the first night so that the site is "zeroed" by having its root zone filled with all the moisture it is able to store.

From them on the programming in the main computer 1 maintains the soil moisture budget for each of the sites registered onto it. It does this by communicating with the weather station 2 and the network of rainfall sensors and establishes how much water will have been transpired by plants in each sub-area 3. This amount is deducted from the soil moisture budget of each site, with additions to the soil moisture budget for each site being made where rain falls in a particular sub-area 3.

When the soil moisture budget being maintained by the system for each site indicates that the soil moisture content has fallen to the Refill Point for a particular site, that site is placed in an Action List for that day. Sites on the Action List for any particular day are activated by the system in early evening. This is done by the main computer 1 sending a data string through the numeric paging network of an appropriate telecommunications provider such that the switch 4 closes for a programmed period (typically but not necessarily 12 hours) thus allowing irrigation to occur during that 12 hour period under the influence of controller 5.

After 12 hours the switch 4 opens which prevents irrigation on subsequent nights. Irrigation cannot occur again until the data string is once more received from main computer 1 causing the switch 4 to close. The soil moisture budget of sites on the Action List is altered to reflect the receipt of the Optimum Irrigation Event during the following day, provided that the irrigation was not interrupted by rain.

Should rain fall it will be detected by the rainfall sensors positioned in the sub-area 3. If it is outside the programmed operating window of controller 5, it will be passively recorded by the rainfall sensors and up loaded as data each day by the main computer 1. It will then be added to the soil moisture budget of sites in the main computer 1 which recorded the rainfall. Rainfall with therefore delay irrigation until it has been transpired or harvested by the plants or evaporated.

If the rainfall is within the operating window of the controller 5 (that is when irrigation is likely to be occurring) the data accumulating logger connected to the rainfall sensor detecting rainfall will contact the main computer 1 and advise that rain is falling in that sub-area 3. In this case all sites from that sub-area 3 on that evening's action list will be sent a data string causing the switch 4 to open, thus bringing irrigation within that sub-area 3 to an immediate halt. This may in some circumstances be done by a broadcast call which will be acted upon by all switches 4 in the designated sub-area 3. The main computer 1 will then track the rainfall event and add it to the soil moisture budget of the relevant sites. If the total rainfall event is significant, irrigation will not resume that evening. If the system deems that the rainfall event is not significant, then irrigation may resume that evening.

The switch 4 operates in the common wire 9 of controller 5. This associated controller can be an inexpensive controller which may have been installed on the irrigation system to be managed prior to adopting the irrigation control system of the invention.

The switch 4 typically consists of, but is not limited to, the following means:

paging system receiver means
microprocessor means
memory area means
clock means
one or more switching relay means.

Switch 4 is capable of receiving a detailed program containing switching instructions for the operation of one or more relay means. It is capable of receiving a particular string which is intended for it alone, or depending on the structure or content of the transmitted data stream, it can also respond to a broadcast type call intended to simultaneously give rise to a specific action or group of actions within an entire group of switches 4.

The relay means of the switch 4 may be either of the normally open or normally closed type depending upon the circumstances.

Further switch 4 is capable of receiving, processing and storing data strings including (but not limited to) the following types of information, which would normally be transmitted (but not necessarily) in the following order:

1. General call or broadcast recognition characters
2. Sub-area identification number.
3. Specific unit recognition or capture code (characters).
4. Specified task designation characters (normally used to designate tasks the subject of a broadcast call).
5. Program definition characters of the general type (but not limited to)—relay one close/open at (time) for duration (minutes); on (date);—relay n, close/open at (time); for duration (minutes); on (date).
6. Test time.
7. Lock/unlock code (prevent all irrigation operations until receipt of particular unlock code).

Also included in switch 4 may be an accessible momentary switch means which, if pressed or otherwise operated, will allow irrigation operations in the absence of system authorisation to do so for a programmable "Test" time. In other words the switch 4 will restore the integrity of the common wire 10 of the controller 5 with which it is associated. This is to allow the associated controller 5 and its in-field irrigation system to be tested.

The claims defining the invention are as follows:

1. An irrigation control system for land including:
   (a) at least one first means to measure one or more weather conditions in a first area;
   (b) at least one second means to measure rainfall in a sub-area of the first area; and
   (c) control means connected directly or indirectly to the first and second means, the control means adapted to monitor the measurements of the first and second means, to calculate a moisture content value for the sub-area from the measurements and a predetermined moisture loss for the sub-area, and to regulate irrigation of the sub-area.

2. The irrigation control system of claim 1 wherein the control means is adapted to regulate irrigation by the sub-area by either initiating or preventing irrigation of the sub-area depending upon whether the moisture content value is less than or more than a predetermined moisture content value for the sub-area.

3. The irrigation control system of claim 1 having one first means in each sub-area.

4. The irrigation control system of claim 1 having one second means in each sub-area.

5. The irrigation control system of claim 4 wherein the first means and second means are combined into a single measuring means.

6. The irrigation control system of claim 1 further including a local switch means in the sub-area to initiate or prevent irrigation in response to signals from the control means.

7. The irrigation control system of claim 1 wherein the local switch means in the sub-area energizes or de-energizes a local control means for initiating or preventing the irrigation, in response to signals from the control means.

8. The irrigation control system of claim 1 further including interruption means to interrupt irrigation in the sub-area.

9. The irrigation control system of claim 8 wherein the interruption means interrupts irrigation in the sub-area in response to rainfall in the sub-area.

10. The irrigation control system of claim 7 wherein the interruption occurs for a period of time determined by the control means.

11. The irrigation control system of claim 1 wherein the one or more weather conditions includes solar radiation.

12. The irrigation control system of claim 1 wherein second means includes a sensing means, a measuring means and a data logger.

13. The irrigation control system of claim 1 wherein the control means is a computer.

14. A method of irrigating land including the steps of:

(a) measuring one or more weather conditions in a first area;

(b) measuring rainfall in a sub-area of the first area;

(c) monitoring the measurements;

(d) calculating a moisture content value for the sub-area from the measurements and a predetermined moisture loss for the sub-area; and (e) regulating the irrigation of the sub-area.

15. The method of claim 14 wherein regulating the irrigation of the sub-area is either by initiating or preventing irrigation of the sub-area depending upon whether the moisture content value is less than or more than a predetermined moisture content value for the sub-area.

16. The method of claim 14 wherein the measurement in step (a) is carried out in the same sub-area as that in which the measurement is carried out in step (b).

17. The method of claim 14 including the further step of (f) sensing for rainfall in the sub-area during irrigation and interrupting irrigation in response to rainfall in the sub-area for a period of time controlled by the duration and amount of rainfall.

18. The method of claim 14 wherein the weather conditions of step (a) include solar radiation.

19. The irrigation control system of claim 2 having one first means in each sub-area.

20. The irrigation control system of claim 8 wherein the interruption occurs for a period of time determined by the control means.

21. The method of claim 15 wherein the measurement in step (a) is carried out in the same sub-area as that in which the measurement is carried out in step (b).

* * * * *